United States Patent
Liu et al.

(10) Patent No.: US 12,238,002 B2
(45) Date of Patent: Feb. 25, 2025

(54) METHOD AND DEVICE FOR SEGMENT ROUTING SERVICE PROCESSING, ROUTING EQUIPMENT, AND STORAGE MEDIUM

(71) Applicant: ZTE CORPORATION, Shenzhen (CN)

(72) Inventors: Yao Liu, Shenzhen (CN); Zheng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 349 days.

(21) Appl. No.: 17/758,761

(22) PCT Filed: Oct. 30, 2020

(86) PCT No.: PCT/CN2020/125128
§ 371 (c)(1),
(2) Date: Jul. 13, 2022

(87) PCT Pub. No.: WO2021/143279
PCT Pub. Date: Jul. 22, 2021

(65) Prior Publication Data
US 2023/0067091 A1 Mar. 2, 2023

(30) Foreign Application Priority Data
Jan. 14, 2020 (CN) .......................... 202010038792.7

(51) Int. Cl.
*H04L 45/74* (2022.01)
*H04L 45/50* (2022.01)

(52) U.S. Cl.
CPC .............. *H04L 45/74* (2013.01); *H04L 45/50* (2013.01)

(58) Field of Classification Search
CPC ......... H04L 45/34; H04L 45/50; H04L 45/74; Y02D 30/00
See application file for complete search history.

(56) References Cited

U.S. PATENT DOCUMENTS

| | | | |
|---|---|---|---|
| 6,870,824 B1 * | 3/2005 | Kim ..................... | H04B 7/2628 370/335 |
| 2002/0120750 A1 | 8/2002 | Nidd | |

(Continued)

FOREIGN PATENT DOCUMENTS

| | | |
|---|---|---|
| CN | 102118370 B | 12/2014 |
| CN | 105450437 A | 3/2016 |

(Continued)

OTHER PUBLICATIONS

Dawra. BGP-LS Advertisement of Segment Routing Service Segments draft-dawra-idr-bgp-ls-sr-service-segments-01; Jan. 16, 2019. (Year: 2019).*

(Continued)

*Primary Examiner* — Stephen J Clawson
(74) *Attorney, Agent, or Firm* — Vivacqua Crane, PLLC

(57) ABSTRACT

Disclosed are a method and apparatus for segment routing service processing, a routing device and a non-transitory computer-readable storage medium. The method for segment routing service processing may include acquiring service attribute information of a target node comprising an SR service node and an SR proxy node, and transmitting a notification message containing the service attribute information to a second SR node.

17 Claims, 4 Drawing Sheets

(56) References Cited

U.S. PATENT DOCUMENTS

| | | | |
|---|---|---|---|
| 2008/0019688 A1* | 1/2008 | Sun | H04J 14/0227 |
| | | | 398/2 |
| 2014/0317259 A1 | 10/2014 | Previdi et al. | |
| 2014/0376402 A1* | 12/2014 | Dutt | H04L 41/0843 |
| | | | 370/254 |
| 2017/0026224 A1 | 1/2017 | Townsley et al. | |
| 2019/0090159 A1* | 3/2019 | Zhou | H04W 76/10 |
| 2021/0014146 A1* | 1/2021 | Chen | H04L 67/56 |

FOREIGN PATENT DOCUMENTS

| | | |
|---|---|---|
| CN | 104219226 B | 10/2017 |
| CN | 107566272 A | 1/2018 |
| CN | 108023815 A | 5/2018 |
| CN | 108429685 A | 8/2018 |
| CN | 108512758 A | 9/2018 |
| CN | 110061920 A | 7/2019 |

OTHER PUBLICATIONS

The State Intellectual Property Office of People's Republic of China. First Office Action for CN Application No. 2020100387927 and English translation, mailed Jul. 28, 2023, pp. 1-10.
The State Intellectual Property Office of People's Republic of China. First Search Report for CN Application No. 2020100387927 and English translation, mailed Jul. 24, 2023, pp. 1-6.
Yuan, H., et al. "Study on Source Routing-based High Speed Routing Protocol," Communications Technology, vol. 43, No. 01, 2017.
International Searching Authority. International Search Report and Written Opinion for PCT Application No. PCT/CN2020/125128 and English translation, mailed Jan. 27, 2021, pp. 1-11.

\* cited by examiner

METHOD AND DEVICE FOR SEGMENT ROUTING SERVICE PROCESSING, ROUTING EQUIPMENT, AND STORAGE MEDIUM

CROSS-REFERENCE TO RELATED APPLICATION

This application is a national stage filing under 35 U.S.C. § 371 of international application number PCT/CN2020/125128, filed Oct. 30, 2020, which claims priority to Chinese patent application No. 202010038792.7, filed Jan. 14, 2020. The contents of these applications are incorporated herein by reference in their entirety.

TECHNICAL FIELD

The present disclosure relates to a wireless communication network, for example, to a method and apparatus for segment routing service processing, a routing device and a non-transitory computer-readable storage medium.

BACKGROUND

Segment routing (SR) is a routing method based on the source address. The nodes (routers, hosts, etc.) in the routing network guide SR service messages to pass through the network along a certain path by interpolating a segment list with sequence numbers in the data header, thereby realizing the forwarding and processing of the SR service messages among the nodes. In order to enable the control plane to orchestrate each SR service, each SR service data must be reported to the control plane through the node corresponding to the SR service data. In this case, the data that can be acquired or reported by each node is one-sided, resulting in single distribution of SR service data and low flexibility of transmission. As a result, it is disadvantageous for the flexible deployment and scheduling of the segment routing network.

SUMMARY

The present disclosure provides a method and apparatus for segment routing service processing, a routing device and a non-transitory computer-readable storage medium in order to improve the distribution of SR service data and the flexibility of transmission.

An embodiment of the present disclosure provides a method for segment routing service processing, the method may include acquiring service attribute information of a target node, the target node including an SR service node and an SR proxy node; and transmitting, to a second SR node, a notification message containing the service attribute information.

An embodiment of the present disclosure further provides an apparatus for segment routing service processing, the apparatus may include an information acquisition module and a notification module. The information acquisition module configured to acquire service attribute information of a target node, the target node including an SR service node and an SR proxy node. The notification module configured to transmit, to a second SR node, a notification message containing the service attribute information.

An embodiment of the present disclosure further provides a routing device. The routing device may include one or more processors and a storage device. The storage device is configured to store one or more programs which, when executed by the one or more processors, cause the one or more processors to implement the above-described method for segment routing service processing.

An embodiment of the present disclosure further provides a computer-readable non-transitory storage medium storing computer programs that, when executed by a processor, cause the processor to implement the above-described method for segment routing service processing.

DETAILED DESCRIPTION

The present disclosure will be described below by embodiments with reference to the accompanying drawings. The embodiments described herein are merely used for explaining the present disclosure, rather than limiting the present disclosure. It is to be noted that the embodiments in the present disclosure and the features in the embodiments can be arbitrarily combined with each other if not conflicted.

SR is a routing method based on the source address. A segment routing header (SRH) is carried in the header of the multi-protocol label switching (MPLS) network or the header of the Internet protocol version 6 (IPv6), and a series of indication operations (also called segment operations) are carried in the SRH, so that the routing and transmission of data can be realized. By including the segment identifier (SID) of each SR service together with other types of SIDs in the segment list and the SID list, the service path can be specified, thereby realizing the orchestration of SR services. During the orchestration of SR services, the services are classified into SR aware services and SR unaware services. For an SR aware service, one SID can be directly assigned; while for an SR unaware service, this SR unaware service needs to be replaced with an SR proxy to handle SR traffic. In this case, the SID of the SR service is configured on the SR proxy and associated with the service on the SR proxy. The SR proxy is a logical concept. The SR proxy may be integrated with a router, or may be implemented by a separate physical device or virtualized device. The SR proxy may be aware of the routing protocol to a limited extent, or may be unaware of the routing protocol, or may be unaware of the extension of the routing protocol with regard to the SR.

In order to enable the control plane to orchestrate each SR service, each SR service data must be reported to the control plane through the node corresponding to the SR service data. In this case, the data that can be acquired or reported by each node is one-sided, resulting in single distribution of SR service data and low flexibility of transmission. As a result, it is disadvantageous for the flexible deployment and scheduling of the segment routing network.

In an embodiment of the present disclosure, a method for segment routing service processing is provided, wherein a first SR node acquires service attribute information of a target node and transmits the service attribute information to other SR nodes, so that the service attribute information is flooded in the whole network and the distribution of SR service data and the flexibility of transmission are improved. On this basis, any node in the segment routing network can know the service attribute information and can report it to the control plane, so that it is advantageous for the flexible deployment and scheduling of the network.

Figure 1:
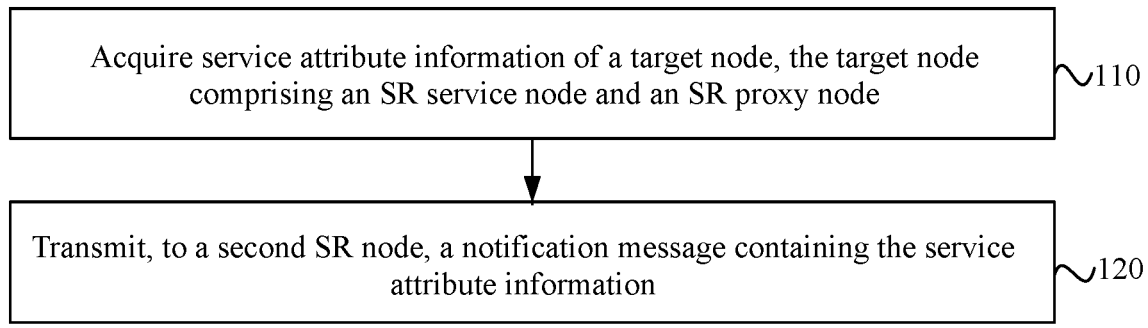
FIG. 1 is a flowchart of a method for segment routing service processing according to an embodiment.

FIG. 1 is a flowchart of a method for segment routing service processing according to an embodiment. As shown in FIG. 1, the method provided in this embodiment includes steps S110 and S120.

At S110, service attribute information of a target node is acquired, and the target node includes an SR service node and an SR proxy node.

At S120, a notification message containing the service attribute information is transmitted to a second SR node.

The method for segment routing service processing in this embodiment may be applied to a first SR node, and the target node refers to a node deployed with an SR service (e.g., firewall, load balancing or other services) in the SR network.

Figure 2:
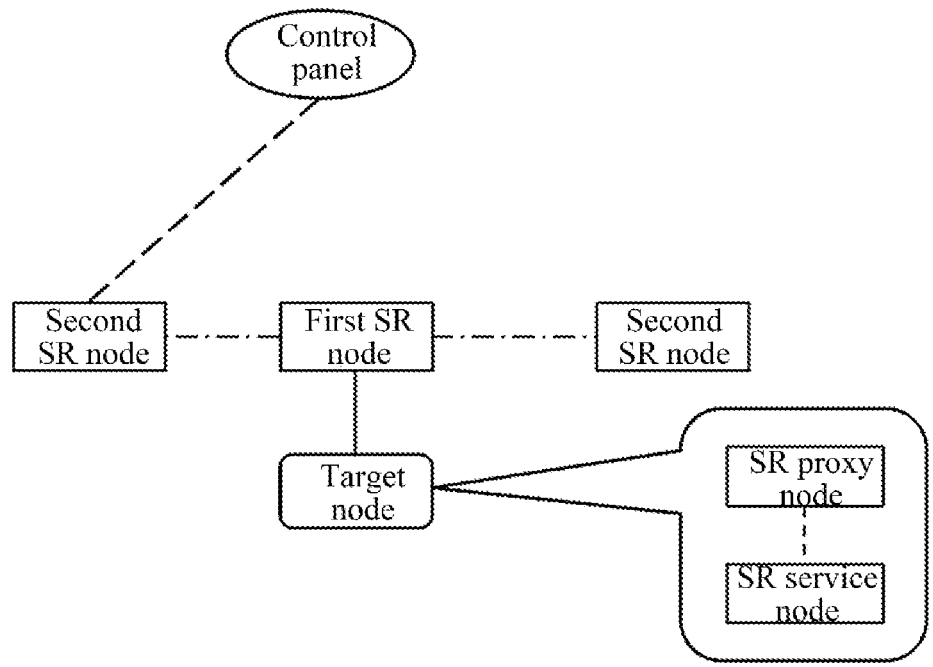
FIG. 2 is a schematic diagram of a segment routing network according to an embodiment.

FIG. 2 is a schematic diagram of a segment routing network according to an embodiment. The ligatures in FIG. 2 merely represent logical connections. As shown in FIG. 2, the first SR node is adjacent to the target node, and acquires the service attribute information from the target node and then notifies it to other nodes (second SR nodes) in the SR network, so that the nodes in the whole network can know the service attribute information of the deployed SR service, thereby realizing the flooding of the service attribute information. The target node may be an SR-aware SR service node or an SR-unaware SR proxy node. In some embodiments, the target node may be the first SR node itself, that is, the first SR node notifies the service attribute information of this node to the second SR node.

In an embodiment, the service attribute information is reported to the control plane through the first SR node or the second SR node.

On the basis that both the first SR node and the second SR node acquire the service attribute information, for the centralized control plane, either the first SR node or the second SR node may report the service attribute information to the control plane, and the control plane performs service orchestration to associate each SR service with one SID. In some embodiments, the control plane may also be distributed, that is, the first SR node or the second SR node may perform service orchestration according to the service attribute information. In this case, it is unnecessary to report the service attribute information.

In an embodiment, in a case where the target node is an SR service node, the service attribute information includes: the first SID, service type and service related information of the SR service; and, in a case where the target node is an SR proxy node, the service attribute information includes: the second SID, proxy type, service type and service related information corresponding to the SR service in the SR proxy node. In this embodiment, if the target node is aware of SR, the target node is an SR service node; and, if the target node is unaware of SR, the target node is an SR proxy node. In a case where the target node is an SR service node, the service attribute information acquired by the first SR service node and the service attribute information notified to the second SR node include: the first SID, service type (e.g., firewall, load balancing, etc.) and other service related information (e.g., manufacturer information, version information, etc.) of the SR service; and, in a case where the target node is an SR proxy node, the service attribute information acquired by the first SR service node and the service attribute information notified to the second SR node further include the proxy type, in addition to the second SID, service type and other service related information corresponding to the SR service in the target node.

In an embodiment, in a case where the target node is an SR proxy node, the proxy type satisfies the followings: in a case where the target node belongs to an SRv6 network and is aware of SRv6 programming, the proxy type is represented by a function field, and the function defined by the function field includes a first function corresponding to a static proxy, a second function corresponding to a dynamic proxy and a third function corresponding to a masquerading proxy; and, in a case where the target node belongs to the segment routing multi-protocol label switching (SR-MPLS) network or is unaware of SRv6 programming, the proxy type is represented by a proxy type field, and the proxy type includes static proxy, dynamic proxy and masquerading proxy.

In this embodiment, in a case where the target node is an SR proxy node, the proxy type of the SR proxy node may be represented in the following two ways according to the network type and whether it is aware of SRv6 programming.

Way 1: In a case where the network type is the SRv6 network and the SR proxy node is aware of SRv6 programming, the proxy type is represented by a Function field, and the Function may indicate any function of the routing device, for example, a forwarding behavior, a service, etc. In this embodiment, the Function includes the first function (e.g., END.AS) corresponding to the static proxy, the second function (e.g., END.AD) corresponding to the dynamic proxy and the third function (e.g., END.AM) corresponding to the masquerading proxy. The proxy type in the service attribute information may be transmitted or notified among different nodes according to the Function field. END represents the end point function, and all actions of SRv6 network programming start with END. END.AS, END.AD and END.AM correspond to three actions of the static proxy, the dynamic proxy and the masquerading proxy, respectively. The END.XX is the name of the Function. In the actual notification process, a numerical value may be registered for each Function, and the Function field carried in the notification protocol may be a numerical value and therefore indicate the corresponding Function. In this embodiment, the inclusion of other extended Functions is not excluded.

Way 2: In a case where the network type is the SRv6 network but the SR proxy node is unaware of SRv6 programming or the network type is the SR-MPLS network, the proxy type field directly indicates that the SR proxy node is a static proxy, a dynamic proxy, a masquerading proxy or other types of proxies.

In an embodiment, data is transmitted between the first SR node and the target node through extended protocol messages of the link layer discovery protocol (LLDP) and the interior gateway protocol (IGP); and, the IGP includes the open shortest path first (OSPF) protocol and the intermediate system to intermediate system (IS-IS) protocol.

In an embodiment, data is transmitted between the first SR node and the second SR node through IGP, and the IGP includes the OSPF protocol and the IS-IS protocol; and, the service attribute information is contained in the extended Tag-Length-Value (TLV), the sub-TLV or the sub-sub-TLV.

In this embodiment, the transmission or notification of the service attribute information is carried out through the extended TLV, the sub-TLV or the sub-sub-TLV, and the service attribute information of the target node may be contained in the same field or may be transmitted or notified through a plurality of fields.

In some embodiments, the data transmission between the first SR node and the second SR node may also be realized through other protocols, e.g., the border gateway protocol (BGP), routing in fat trees (RIFT), etc.

In an embodiment, data is transmitted between the first SR node and the second SR node through an IS-IS protocol; and, in a case where the target node belongs to an SRv6 network and is aware of SRv6 programming, the service attribute information is contained in a sub-TLV and a sub-sub-TLV, the sub-TLV carries the second SID and the Function field, and the sub-sub-TLV carries the service type.

Figure 3:
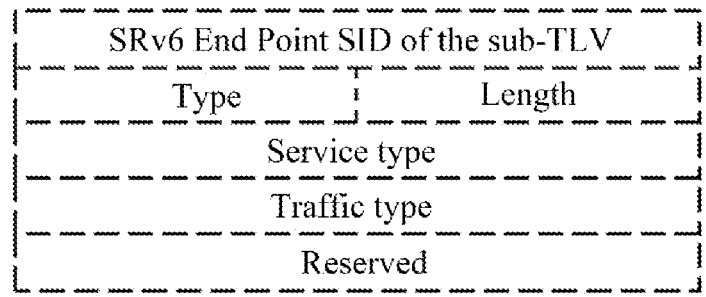
FIG. 3 is a schematic diagram of an extended sub-sub-TLV under an IS-IS protocol according to an embodiment.

FIG. 3 is a schematic diagram of an extended sub-sub-TLV in an IS-IS protocol according to an embodiment. As shown in FIG. 3, for the IS-IS protocol, one possible extension mode is that: in a case where the SR network is aware of SRv6 programming, the second SID and the Function field may be carried in the SRv6 end point SID of the sub-TLV to extend a new sub-sub-TLV. In this sub-sub-TLV, the service type field carriers the service type; the traffic type field carries the traffic type supported by the service, e.g., Ipv4, Ipv6, etc.; and, the reserved field is extended to carry other information, e.g., manufacturer, version information, etc.

In an embodiment, in a case where the target node belongs to an SR-MPLS network or is unaware of SRv6 programming, the service attribute information is contained in at least one extended TLV.

Figure 4:
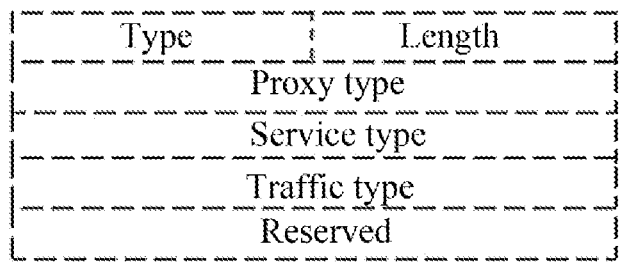
FIG. 4 is a schematic diagram of an extended sub-TLV under an IS-IS protocol according to an embodiment.

FIG. 4 is a schematic diagram of the extended sub-TLV in the IS-IS protocol according to an embodiment. As shown in FIG. 4, for the IS-IS protocol, one possible extension mode is that: in a case where the network type is the SR-MPLS network or the SRv6 network is unaware of programming, the proxy type and other service attribute information are notified in the extended TLV, or separately notified through a plurality of control TLVs.

In an embodiment, the target node is an SR service node, and data is transmitted between the first SR node and the second SR node through the IS-IS protocol. In a case where the target node belongs to an SRv6 network and is aware of SRv6 programming, the service attribute information is contained in the sub-TLV and the sub-sub-TLV, the sub-TLV carries the first SID, and the service type field in the sub-sub-TLV carries the service type; and, in a case where the target node belongs to the SR-MPLS network or is unaware of SRv6 programming, the service attribute information is contained in at least one extended TLV. Or, in a case where the target node belongs to an SRv6 network and is aware of SRv6 programming, the service attribute information is contained in the sub-TLV and the sub-sub-TLV, the sub-TLV carries the first SID and the function field, the service type field in the sub-sub-TLV carries the service type, and the function field is a first set value; and, in a case where the target node belongs to the SR-MPLS network or is unaware of SRv6 programming, the service attribute information is contained in at least one extended TLV, and the proxy type field is a second set value.

In this embodiment, in a case where the target node is aware of SR and does not need to use any proxy, with reference to FIG. 3 or FIG. 4, the field representing the proxy type in the extended information is removed, or the field representing the proxy type is reserved but a set special value is used to indicate that the service is aware of no proxy.

In an embodiment, the service attribute information is transmitted between the first SR node and the control plane or between the second SR node and the control plane through one of the following: the border gateway protocol (BGP), the border gateway protocol-link state (BGP-LS), the path computation element communication protocol (PCEP) and yet another next generation data modeling language (YANG) model.

Figure 5:
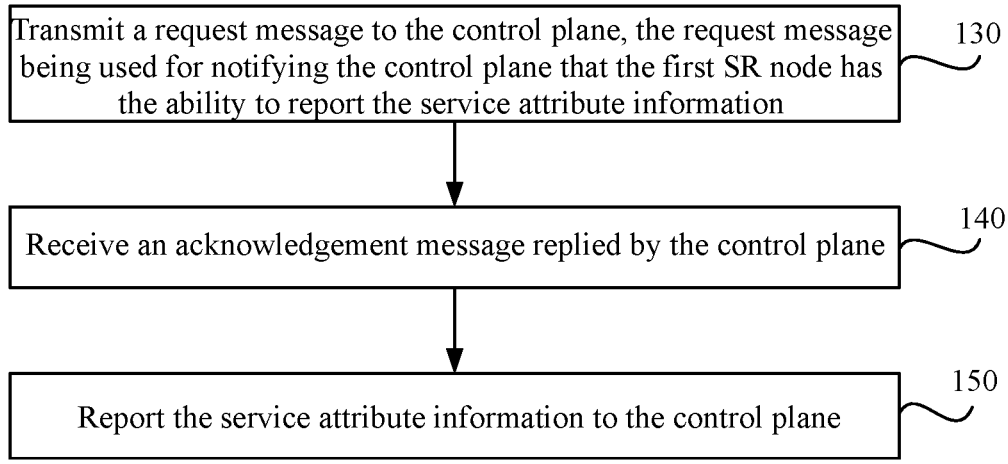
FIG. 5 is a flowchart of reporting service attribute information according to an embodiment.

FIG. 5 is a flowchart of reporting service attribute information according to an embodiment. As shown in FIG. 5, the process of reporting, by the SR node, service attribute information to the control plane includes steps S130 to S150.

At S130, a request message is transmitted to the control plane, the request message being used for notifying the control plane that the first SR node has the ability to report the service attribute information.

At S140, an acknowledgement message replied by the control plane is received.

At S150, the service attribute information is reported to the control plane.

In some embodiments, on the basis of flooding the service attribute information in the whole network, the service attribute information may also be reported to the control plane by the second SR node. That is, the second SR node transmits a request information to the control plane so as to notify the control plane that the second SR node has the reporting ability, and reports the service attribute information upon receiving an acknowledgement message replied by the control plane.

In an embodiment, the service attribute information is transmitted between the first SR node and the control plane through PCEP; the request message includes an open message in the PCEP; and, the service attribute information is reported through an explicit route object (ERO) field in the PCEP.

In this embodiment, the first SR node notifies, through the open message in the extended PCEP, the control plane that this node supports the ability to notify the service attribute information instead of the proxy node; and, the service attribute information may be reported through the extended ERO field. In some embodiments, the service attribute information may also be carried through a YANG model, thereby realizing the reporting of the service attribute information.

In an embodiment, the target node is an SR proxy node; and, before acquiring service attribute information of a target node, the method further includes: configuring a local SID, the local SID being used for indicating an associated SR proxy node; and, notifying reachable information to the second SR node, the reachable information including the local SID.

In this embodiment, in a case where the target node is an SR proxy node, if no SR extension-aware protocol is run between the SR proxy node and the adjacent first SR node, a local SID may be directly configured on the first SR node, so that the first SR node obtains the service attribute information. During the configuration of the local SID on the first SR node, the attribute information of the SR proxy node, the processing mode for this local SID (e.g., whether to process a SID list, next hop or outgoing port on this node), etc. may also be configured, and the local SID is notified as the reachable information of the local SID of the first SR node. That is, the SID is not assigned to the SR proxy node, and a local SID is directly configured for the adjacent first SR node to represent the SR proxy node. During the notification process, only the information of the local SID is notified, but the SR proxy node is not exposed. If the SR proxy node needs to participate in the service orchestration, this local SID is orchestrated in the SID list, so that the service logic of the R proxy node is simplified. Particularly for a static proxy and a dynamic proxy, the SID list is processed by the first SR node adjacent to the SR proxy node, and the SR proxy node only needs to reserve the cache and the forwarding logic, without processing the logic of the SID list, so that the logic of the SR proxy node is simplified.

In an embodiment, the method further includes: generating a forwarding table according to related information of the SR proxy node; receiving an SR service message orchestrated by the control plane; transmitting the SR service message to the SR proxy node according to the forwarding table; and, receiving the SR service message returned by the SR proxy node. Before transmitting the SR service message to the SR proxy node according to the forwarding table or after receiving the SR service message returned by the SR proxy node, the method further includes: processing the SR service message according to the forwarding table.

In this embodiment, the first SR node adjacent to the SR proxy node generates a local forwarding table according to the related information of the SR proxy node notified through a protocol or configured locally; upon arriving the first SR node, the orchestrated SR service message is processed by the first SR node according to the forwarding table, and the message is transmitted to the SR proxy node; and, the message processed is returned to the first SR node by the SR proxy node, and the first SR node further processes the message according to the orchestration condition.

Figure 6:
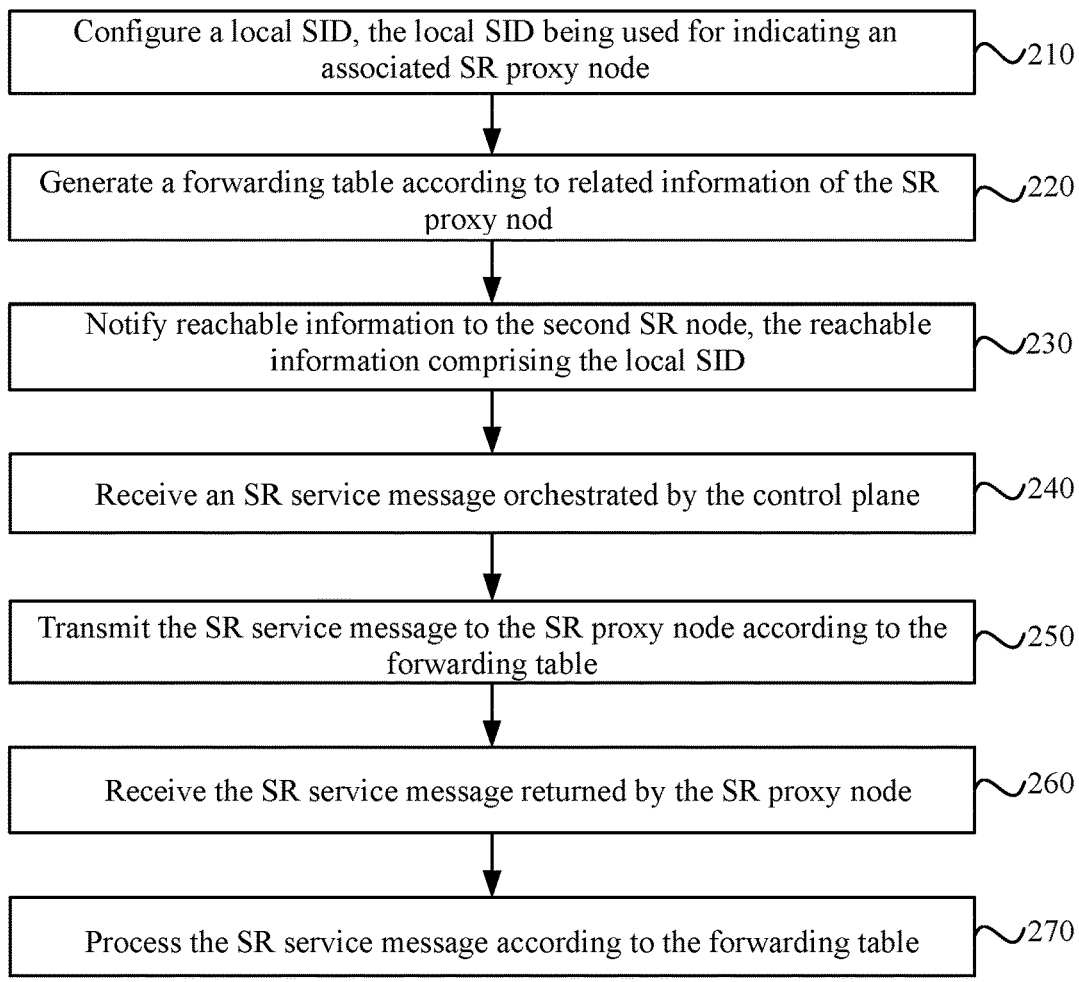
FIG. 6 is a flowchart of processing a segment routing service message according to an embodiment.

FIG. 6 is a flowchart of processing a segment routing service message according to an embodiment. As shown in FIG. 6, the process of processing an SR service message includes steps S210 to S270.

At S210, a local SID is configured, the local SID being used for indicating an associated SR proxy node.

At S220, a forwarding table is generated according to related information of the SR proxy node.

At S230, reachable information is notified to the second SR node, the reachable information including the local SID.

At S240, the SR service massage generated after orchestration is received.

At S250, the SR service message is transmitted to the SR proxy node according to the forwarding table.

At 260, the SR service message returned by the SR proxy node is received.

At 270, the SR service message is processed according to the forwarding table.

In an embodiment, the SR service message may be processed before the step 250 (the SR service message is first processed and then transmitted to the SR proxy node), or may be processed after the step 260 (the SR service message is first transmitted to the SR proxy node and then processed upon receiving the returned message).

In a case where the target SID is of a local SID type, the first SR node also transmits the SR service message to the SR proxy node for processing according to the processing mode for the target SID, and the SR proxy node receives and processes the SR service message and then returns it to the first SR node. The first SR node also correctly processes the SID list. This process may be performed before the message is transmitted to the SR proxy node, or may be performed after the message processed and returned by the SR proxy node is received.

In an embodiment, the related information of the SR proxy node includes: the target SID associated with the SR proxy node, the source of the target SID, the type of the target SID, the proxy type corresponding to the target SID and the service type corresponding to the target SID; the source of the target SID includes notifying through a protocol and configuring locally; the type of the target SID includes non-local SID and local SID (the local SID means that the target SID is configured locally and represents the SID of the SR proxy node associated with this node, and the non-local SID means that the target SID is the SID assigned to the SR proxy node); and, the priority of the forwarding table generated according to the local SID is higher than that of the forwarding table generated according to the non-local SID.

In this embodiment, the SID is not assigned to the SR proxy node, and a new local routing prefix SID is configured on the adjacent first SR node to represent this SR proxy node. In this case, for the target SID of this type, during the configuration process, it is also necessary to indicate the processing mode for this target SID, including the information about the outgoing interface or the next hop, possible message encapsulation information, etc. The first SR node determines the priority according to the type of the target SID, or separately determines a forwarding table to store the above information. The priority of this forwarding table is higher than that of the forwarding table corresponding to the non-local SID.

In an embodiment, in a case where the type of the target SID is the local SID and the target SID is configured as an SRv6 programming format, the target SID is used for notifying the proxy type.

In this embodiment, for the acquired target SID of the non-local SID type that is notified through a protocol or configured locally, after the first SR node receives an SR service message, the processing process includes: processing an SRH, and transmitting the SR service message to the SR proxy node according to the forwarding table. However, for the target SID of the local SID type, in a case where the target SID is configured as an SRv6 programming format, this target SID is only used for notifying the proxy type and does not represent the real processing mode of the data plane. That is, even if the configured programming format is aware of SRv6 programming, the first SR node will perform processing according to the fact that it is unaware of SRv6 programming. Instead of executing the SRv6 programming action corresponding to the target SID, the first SR node directly processes the SRH, and forwards the SR service message to the SR proxy node for processing according to the forwarding table.

In an embodiment, the forwarding table includes: the target SID, the type of the target SID and the first processing mode for the target SID; and, in a case where the SR service message is processed according to the forwarding table after the SR service message returned by the SR proxy node is received, the forwarding table further includes: the feature of the target SID and the second processing mode for the target SID.

In this embodiment, the generated forwarding table includes: the target SID, the type of the target SID and the first processing mode for the target SID (including the outgoing interface or the next hop, possibly including outgoing interface encapsulation information, whether to process the Segment List, etc.). If the processing of the SR service message is performed after the message returned by the SR proxy node is received but not before the message is transmitted to the SR proxy node, the generated forwarding table further includes the feature of the target SID and the second processing mode for the target SID. The SID feature is used for distinguishing whether the forwarding table is a first forwarding table before being transmitted to the SR proxy node or a second forwarding table after the message returned by the SR proxy node is received and identifying whether the SR service message is returned from the SR proxy node. For example, the SID feature may be an incoming port of the SR service message. The first processing mode and the second processing mode for the target SID mainly refer to the processing modes for the SID list.

In an embodiment, the target SID is a new routing prefix SID, or the target SID consists of an interface prefix for notifying the reachable information and a set function.

In an embodiment, the transmitting the SR service message to the SR proxy node according to the forwarding table includes: in a case where the target SID consists of an interface prefix for notifying the reachable information and a set function, transmitting the SR service message to the SR proxy node according to the interface prefix and the set function.

In this embodiment, the target SID is formed by an interface prefix such as Loopback to be notified by the first SR node itself and in combination with the set Function, but is not represented by the new routing prefix. In this case, the first SR node may be aware of a plurality of target SIDS, and the plurality of target SIDS are of the local SID type and correspond to different Functions. In this case, after the first SR node receives an SR service message and matches it to a locator (LOC) according the target SID, the first SR node needs to further execute the corresponding forwarding action according to the carried Function. If the entry of the Function indicates that the message is processed by the SR proxy node and indicates the corresponding local forwarding interface, the SR service message needs to be transmitted to the SR proxy node through the local forwarding interface.

In the above embodiment, the first SR node notifies the target SID to other SR nodes in the network, so that other SR nodes can correctly forward the SR service message to this node. The notification may be performed through various routing protocols, such as OSPF, IS-IS, BGP or RIFT.

Figure 7:
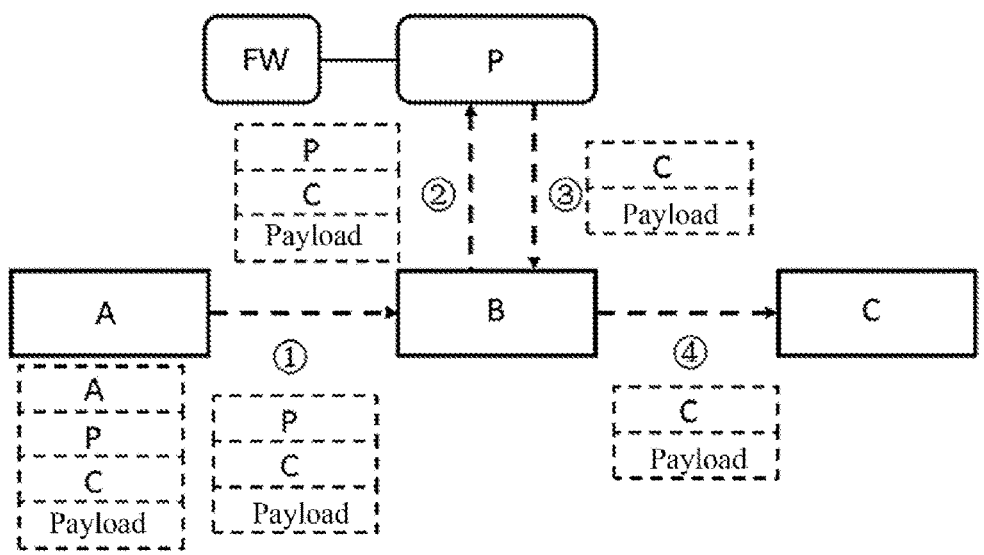
FIG. 7 is a schematic diagram of processing a segment routing service message according to an embodiment.

FIG. 7 is a schematic diagram of processing a segment routing service message according to an embodiment. As shown in FIG. 7, A, B, C and P are the SIDs corresponding to the nodes, respectively; the node A, the node B and the node C are SR-aware routers; the FW is the firewall (FW) service; the node P is the proxy node of the FW service, and the node P is adjacent to the node B; and, the IS-IS protocol is run between the node P and the node B. The connection type between the SR proxy node and the SR service node is not limited in FIG. 7. The connection may be a same physical link, two logical links on the same physical link, or two physical links. Between A and B and between B and C, there may be directly connected links or links passing through a plurality of devices.

The node P notifies the related information of its SR proxy node to the node B through IGP. For example, the information about the P node on the node B includes: the target SID: P; the source of the target SID: notified through the IS-IS protocol; the type of the target SID: non-local SID; the proxy type: static proxy; the service type: FW; the outgoing port or the next hop: XXX1; and, other proxy information: XXX1.

The node B generates a forwarding table according to the service attribute information. For example, the forwarding table includes: the target SID: P; the type of the target SID: non-local SID; and, the outgoing port: port1.

The service orchestrated by the control plane includes the following: the traffic entering the SR network from the node A is processed by the proxy node (the node P) to the firewall and then transmitted to the node C, and the node A encapsulates the SID list corresponding to the orchestrated service into a message. The figure only shows the label processing order and does not represent the actual message encapsulation format. Since the reachable information of the node B has been notified by the node B, the node B may not be orchestrated in the SID list.

The process of processing the SR service message includes the following: 1) the node A queries that the current segment is a local segment, executes a next operation, replaces the destination address (DA), queries the forwarding table by taking the target address as P, and forwards the SR service message from a port pointing to the node B; 2) after the SR service message arrives the node B, the node B queries that the node P is a non-local SID, and forwards the SR service message to an interface connected to the node P according to the forwarding table; 3) upon receiving the SR service message, the node P processes the SID list and forwards the SR service message to the firewall service; the SR service message is returned to the node B after a series of necessary operations; in this case, the SID to be processed currently is C; and, 4) upon receiving the returned SR service message, the node B executes a normal operation (including replacing DA with C, etc.) on the SID list, and then transmits the SR service message according to the forwarding table through an interface pointing to the node C.

Figure 8:
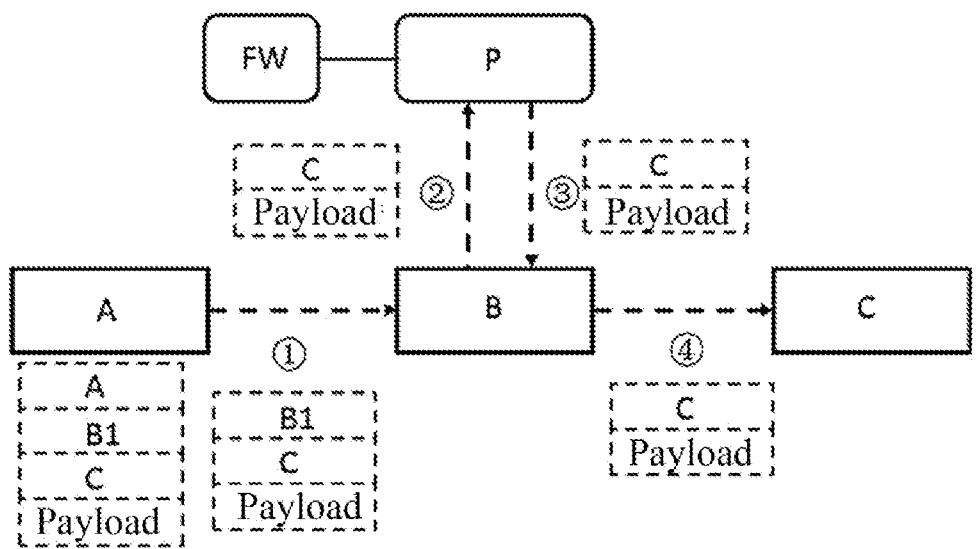
FIG. 8 is a schematic diagram of processing a segment routing service message according to another embodiment.

FIG. 8 is a schematic diagram of processing a segment routing service message according to another embodiment. As shown in FIG. 8, A, B, C and P are the SIDs corresponding to the nodes, respectively; the node A, the node B and the node C are SR-aware routers; the FW is the firewall (FW) service; the node P is the proxy node of the FW service; and the node P is adjacent to the node B. No SID is assigned for the node P, and a SID (B1) is configured on the node B to serve as the proxy SID of the node P.

For example, the information about the node P on the node B includes: the target SID: B1 (the LOC in B1 may be a new routing prefix or a local loopback routing prefix, in a case of using the local loopback routing prefix, the target SID is represented in combination with the new set Function); the source of the target SID: configuring locally; the type of the target SID: local SID; the proxy type: dynamic proxy; the service type: FW; the first processing mode: processing the Segment List; the outgoing port or the next hop: XXX2; and, other proxy information: XXX2.

The node B generates a forwarding table according to the service attribute information. For example, the forwarding table includes: the target SID: B1; the type of the target SID: local SID; the first processing mode: processing the SID list; and, the outgoing port: port1.

In this case, the forwarding tables on the node A and the node C and the forwarding table about other SIDs on the node B are not different from those in the scenario where the target SID is the SID of the SR proxy node. The service orchestrated by the control plane includes the following: the traffic entering the SR network from the node A is processed by the proxy node (the node P) to the firewall and then transmitted to the node C, the path corresponding to the orchestrated service is instantiated on the head node (the node A) in the form of a SID list, and the node A encapsulates the SID list into a message.

The process of processing the SR service message includes the following: 1) the node A queries that the current segment is a local segment, executes a next operation, replaces DA with B1, queries the forwarding table by taking the destination address as B1, and forwards the SR service message from a port connected to the node B; and the node A queries that the current segment is a local segment, executes a next operation, replaces DA with B1, queries the forwarding table by taking the destination address as B1, and forwards the message from a port connected to the node B; 2) after the SR service message arrives the node B, if the node N queries the SID list to determine that B1 is the special proxy SID configured locally, the SR service message is forwarded to an interface connected to the node P according to the forwarding table; 3) upon receiving the SR service, the node P does not process the SID list, where the SID list in the SR service message processed by the node P and the firewall service will remain unchanged and will be returned to the node B, and the SID to be processed currently is C; and, 4) after the node B receives the returned SR service message, the node C is the non-local SID, and the node B queries the forwarding table and forwards the SR service message to the node C.

In the process of processing the SR service message, instead of processing the SID list first at 2), the node B may process the SID list after the node P returns the message at 3).

In the method for segment routing service processing provided in this embodiment, by flooding the service attribute information in the whole network, any node in the network can notify the service attribute information to the control plane, and the controller can obtain the related information of all services in the network and their proxies, so that the distribution of the service attribution information and the flexibility of transmission are improved, and the flexible deployment and scheduling of the network is realized. Moreover, by allowing the first SR node to bear some functions of the SR proxy node, the processing capability of the first SR node is fully utilized, the service logic of the SR proxy node is simplified, and the lightweight and virtualization of the SR proxy node are realized.

Figure 9:
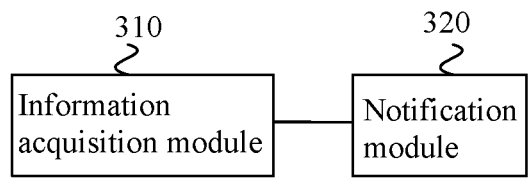
FIG. 9 is a schematic structure diagram of an apparatus for segment routing service processing according to an embodiment.

An embodiment of the present disclosure further provides an apparatus for segment routing service processing. FIG. 9 is a schematic structure diagram of an apparatus for segment routing service processing according to an embodiment. As shown in FIG. 9, the apparatus for segment routing service processing includes: an information acquisition module 310 and a notification mode 320.

The information acquisition module 310 is configured to acquire service attribute information of a target node, the target node may include an SR service node and an SR proxy node. The notification module 320 is configured to transmit, to a second SR node, a notification message containing the service attribute information.

In the apparatus for segment routing service processing provided in this embodiment, by acquiring the service attribute information of the target node and transmitting the service attribute information to other SR nodes, the service attribute information is flooded in the whole network, and the distribution of SR service data and the flexibility of transmission are improved. On this basis, any node in the segment routing network can obtain the service attribute information and can report it to the control plane, so that it is advantageous for the flexible deployment and scheduling of the network.

In an embodiment, the service attribute information is reported to the control plane through the first SR node or the second SR node.

In an embodiment, in a case where the target node is an SR service node, the service attribute information includes: the first SID, service type and service related information of the SR service; and, in a case where the target node is an SR proxy node, the service attribute information includes: the second SID, proxy type, service type and service related information corresponding to the SR service in the SR proxy node.

In an embodiment, in a case where the target node is an SR proxy node, the proxy type satisfies the following: in a case where the target node belongs to an SRv6 network and is aware of SRv6 programming, the proxy type is represented by a function field, and the function defined by the function field includes a first function corresponding to a static proxy, a second function corresponding to a dynamic proxy and a third function corresponding to a masquerading proxy; and, in a case where the target node belongs to an SR-MPLS network or is unaware of SRv6 programming, the proxy type is represented by a proxy type field, and the proxy type includes static proxy, dynamic proxy and masquerading proxy.

In an embodiment, data is transmitted between the first SR node and the target node through extended protocol messages of the LLDP and the IGP; and, the IGP may include the OSPF protocol and the IS-IS protocol.

In an embodiment, data is transmitted between the first SR node and the second SR node through IGP, and the IGP may include the OSPF protocol and the IS-IS protocol; and, the service attribute information is contained in the extended TLV, the sub-TLV or the sub-sub-TLV In an embodiment, data is transmitted between the first SR node and the second SR node through the IS-IS protocol; in a case where the target node belongs to an SRv6 network and is aware of SRv6 programming, the service attribute information is contained in the sub-TLV and the sub-sub-TLV, wherein the sub-TLV carries the second SID and the function field, and the sub-sub-TLV carries the service type; and, in a case where the target node belongs to an SR-MPLS network or is unaware of SRv6 programming, the service attribute information is contained in at least one extended TLV.

In an embodiment, the target node is an SR service node; data is transmitted between the first SR node and the second SR node through an IS-IS protocol; in a case where the target node belongs to an SRv6 network and is aware of SRv6 programming, the service attribute information is contained in the sub-TLV and the sub-sub-TLV, wherein the sub-TLV carries the first SID, and the service type field in the sub-sub-TLV carries the service type; and in a case the target node belongs to an SR-MPLS network or is unaware of SRv6 programming, the service attribute information is contained in at least one extended TLV; or, in a case where the target node belongs to an SRv6 network and is aware of SRv6 programming, the service attribute information is contained in the sub-TLV and the sub-sub-TLV, wherein the sub-TLV carries the first SID and the function field, the service type field in the sub-sub-TLV carries the service type, and the function field is a first set value; and in a case where the target node belongs to an SR-MPLS network or is unaware of SRv6 programming, the service attribute information is contained in at least one extended TLV, and the proxy type field is a second set value.

In an embodiment, the service attribute information is transmitted between the first SR node and the control plane or between the second SR node and the control plane through one of the following: the BGP, the BGP-LS, the PCEP and the YANG model.

In an embodiment, the apparatus further includes: a request module configured to transmit a request message to the control plane, the request message being used for notifying the control plane that the first SR node has the ability to report the service attribute information; an acknowledgement module configured to receive an acknowledgement message replied by the control plane; and, a report module configured to report the service attribute information to the control plane.

In an embodiment, the service attribute information is transmitted between the first SR node and the control plane through a PCEP; the request message includes a start open message in the PCEP; and, the service attribute information is reported through an ERO field in the PCEP.

In an embodiment, the target node is an SR proxy node; and, the apparatus further includes: a configuration module configured to configure a local SID before the service attribute information of the target node is acquired, the local SID being used for indicating an associated SR proxy node; and, a reachable information notification module configured to notify reachable information to the second SR node, the reachable information including the local SID.

In an embodiment, the apparatus further includes: a generation module configured to generate a forwarding table according to related information of the SR proxy node; a message receiving module configured to receive an SR service message orchestrated by the control plane; a message forwarding module configured to transmit the SR service message to the SR proxy node according to the forwarding table; and, a message return module configured to receive the SR service message returned by the SR proxy node. The apparatus further includes: a message processing module configured to process the SR service message according to the forwarding table before the SR service message is transmitted to the SR proxy node according to the forwarding table or after the SR service message returned by the SR proxy node is received.

In an embodiment, the related information of the SR proxy node includes: the target SID associated with the SR proxy node, the source of the target SID, the type of the target SID, the proxy type corresponding to the target SID and the service type corresponding to the target SID; the source of the target SID includes notifying through a protocol and configuring locally; the type of the target SID includes non-local SID and local SID; and, the priority of the forwarding table generated according to the local SID is higher than that of the forwarding table generated according to the non-local SID.

In an embodiment, in a case where the type of the target SID is the local SID and the target SID is configured as an SRv6 programming format, the target SID is used for notifying the proxy type.

In an embodiment, the forwarding table includes: the target SID, the type of the target SID and the first processing mode for the target SID; in a case where the SR service message is processed according to the forwarding table after the SR service message returned by the SR proxy node is received, the forwarding table further includes: the feature of the target SID and the second processing mode for the target SID; and, the target SID is a new routing prefix SID, or the target SID consists of an interface prefix for notifying the reachable information and a set function.

In an embodiment, the message forwarding module is configured to: in a case where the target SID consists of an interface prefix for notifying the reachable information and a set function, transmit the SR service message to the SR proxy node according to the interface prefix and the set function.

This embodiment provides an apparatus for segment routing service processing. The technical details that are not described in this embodiment may refer to any one of the above embodiments of the method for segment routing service processing, and this embodiment has the same technical effects as executing the method for segment routing service processing.

An embodiment of the present disclosure further provides a routing device. The method for segment routing service processing may be executed by the apparatus for segment routing service processing, and the apparatus for segment routing service processing may be implemented by software and/or hardware and integrated in the routing device.

Figure 10:
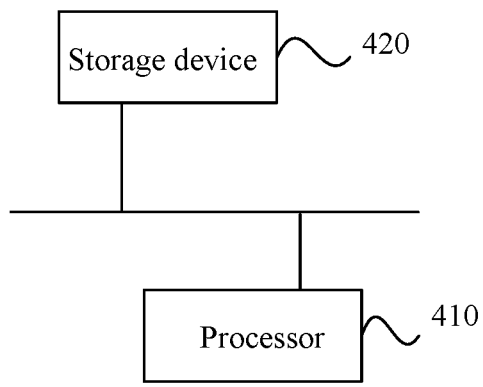
FIG. 10 is a hardware structure diagram of a routing device according to an embodiment.

FIG. 10 is a hardware structure diagram of a routing device according to an embodiment. As shown in FIG. 10, the routing device provided in this embodiment includes a processor 410 and a storage device 420. There may be one or more processors 410 in the routing device, and FIG. 10 is illustrated by taking one processor 410 as an example. The processor 410 and the storage device 420 in the device may be connected via a bus or in other ways, and FIG. 10 is illustrated by taking the processor and the storage device being connected via a bus as an example.

The one or more programs are executed by the one or more processors 410, so that the one or more processors implement the method for segment routing service processing according to any one of the above embodiments.

As a computer-readable storage medium, the storage device 420 in the routing device may be configured to store one or more programs. The programs may be software programs, computer-executable programs and modules, for example, program instructions/modules corresponding to the method for segment routing service processing in the embodiments of the present disclosure (e.g., the modules in the apparatus for segment routing service processing shown in FIG. 9, including the information acquisition module 310 and the notification module 320). By running the software programs, instructions and modules stored in the storage device 420, the processor 410 executes various functional applications and data processing of the routing device, so as to implement the method for segment routing service processing in the above method embodiments.

The storage device 420 mainly includes a program storage region and a data storage region. The program storage region may store the operating system and application programs required by at least one function. The data storage region may store data created according to the use of the device, etc. (e.g., the service attribute information, the notification message, etc. in the above embodiments). The storage device 420 may include a high-speed random-access memory, or may include a non-volatile memory, for example, at least one magnetic disk memory device, a flash memory device or other non-volatile solid-state memory devices. In some instances, the storage device 420 may further include memories remotely arranged relative to the processor 410. These remote memories may be connected to the routing device via a network. Examples of the network include, but not limited to, Internet, Intranet, local area networks, mobile communication networks and combinations thereof.

When one or more programs included in the routing device are executed by the one or more processors 410, the following operations are performed: acquiring service attribute information of a target node, wherein the target node including an SR service node and an SR proxy node; and, transmitting, to a second SR node, a notification message containing the service attribute information.

This embodiment provides a routing device. The technical details that are not described in this embodiment may refer to any one of the above embodiments of the method for segment routing service processing, and this embodiment has the same technical effects as executing the method for segment routing service processing.

An embodiment of the present disclosure further provides a non-transitory computer-readable storage medium containing computer-executable instructions that, when executed by a computer processor, execute a method for segment routing service processing.

From the above description of the implementations, it should be understood by those skilled in the art that the present disclosure may be implemented by means of software and general-purpose hardware or may be implemented by means of hardware. The technical schemes of the present disclosure may be embodied in the form of a software product. The software product may be stored in a computer-readable storage medium, for example, floppy disks, read-only memories (ROMs), random access memories (RAMs), flash memories (FLASH), hard disks or optical disks, and includes a plurality of instructions configured to cause a computer device (which may be a personal computer, a server, a network device, etc.) to execute the method according to any one of the embodiments of the present disclosure.

The foregoing description merely shows the exemplary embodiments of the present disclosure, and is not intended to limit the protection scope of the present disclosure.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, read only memories (ROMs), random access memories (RAMs), optical memory devices and systems (digital video discs (DVDs) or compact discs (CDs)), etc. The computer-readable medium may include non-transient storage mediums. The data processor may be of any type suitable for the local technical environment, for example, but not limited to, general purpose computers, special purpose computers, microprocessors, digital signal processors (DSPs), application specific integrated circuits (ASICs), field programmable gate arrays (FPGAs), and processors based on a multi-core processor architecture.

What is claimed is:

1. A method for segment routing service processing, applicable to a first segment routing (SR) node, the method comprising:
configuring by the first SR node, a local segment identifier (SID), the local SID being used for indicating an associated SR proxy node and preventing the associated SR proxy node from being assigned with an SID, wherein the first SR node is adjacent to the associated SR proxy node;
notifying by the first SR node, reachable information to a second SR node, the reachable information comprising the local SID;
acquiring by the first SR node, service attribute information of the associated SR proxy node; and
transmitting by the first SR node, a notification message containing the service attribute information to the second SR node;
wherein, the method further comprises:
generating by the first SR node, a forwarding table according to related information of the associated SR proxy node;
receiving by the first SR node, an SR service message orchestrated by the control plane;
transmitting by the first SR node, the SR service message to the associated SR proxy node according to the forwarding table; and
receiving by the first SR node, the SR service message returned by the associated SR proxy node; and
before transmitting by the first SR node, the SR service message to the associated SR proxy node according to the forwarding table or after receiving by the first SR node, the associated SR service message returned by the SR proxy node, the method further comprises:
processing by the first SR node, the SR service message according to the forwarding table.

2. The method of claim 1, wherein the service attribute information is reported to a control plane through the first SR node or the second SR node.

3. The method of claim 1, wherein,
the service attribute information comprises:
the second SID, proxy type, service type and service related information corresponding to the SR service in the associated SR proxy node.

4. The method of claim 3, wherein, the proxy type satisfies:
the proxy type being represented by a function field when the associated SR proxy node belongs to an SRv6 network and being is aware of SRv6 programming,
wherein a function defined by the function field comprises a first function corresponding to a static proxy, a second function corresponding to a dynamic proxy and a third function corresponding to a masquerading proxy; and
the proxy type being represented by a proxy type field when the associated SR node belongs to a segment routing multi-protocol label switching (SR-MPLS) network or is unaware of SRv6 programming,
wherein the proxy type comprises one of, static proxy, dynamic proxy or masquerading proxy.

5. The method of claim 1, wherein data is transmitted between the first SR node and the associated SR node through extended protocol messages of a link layer discovery protocol (LLDP) and an interior gateway protocol (IGP).

6. The method of claim 1, wherein data is transmitted between the first SR node and the second SR node through an IGP; and
the service attribute information is contained in an extended Tag-Length-Value (TLV), a sub-TLV or a sub-sub-TLV.

7. The method of claim 4, wherein data is transmitted between the first SR node and the second SR node through an IS-IS protocol;
when the associated SR node belongs to an SRv6 network and is aware of SRv6 programming, the service attribute information is contained in a sub-TLV and a sub-sub-TLV,
wherein, the sub-TLV carries the second SID and the function field, and the sub-sub-TLV carries the service type; and when the associated SR node belongs to an SR-MPLS network or is unaware of SRv6 programming, the service attribute information is contained in at least one extended TLV.

8. The method of claim 3, wherein
data is transmitted between the first SR node and the second SR node through an IS-IS protocol;
when the target node belongs to an SRv6 network and is aware of SRv6 programming, the service attribute information is contained in a sub-TLV and a sub-sub-TLV,
   wherein, the sub-TLV carries the first SID, and the service type field in the sub-sub-TLV carries the service type, and
when the target node belongs to an SR-MPLS network or is unaware of SRv6 programming, the service attribute information is contained in at least one extended TLV; or,
when the target node belongs to an SRv6 network and is aware of SRv6 programming, the service attribute information is contained in a sub-TLV and a sub-sub-TLV,
   wherein, the sub-TLV carries the first SID and the function field, the service type field in the sub-sub-TLV carries the service type, and the function field is a first set value, and
when the target node belongs to an SR-MPLS network or is unaware of SRv6 programming, the service attribute information is contained in at least one extended TLV, and the proxy type field is a second set value.

9. The method of claim 1, wherein,
the service attribute information is transmitted between the first SR node and the control plane or between the second SR node and the control plane through one of:
   a border gateway protocol (BGP),
   a border gateway protocol-link state (BGP-LS),
   a path computation element communication protocol (PCEP) and
   yet another next generation data modeling language (YANG) model.

10. The method of claim 1, further comprising:
transmitting a request message to the control plane, the request message being used for notifying the control plane that the first SR node has the ability to report the service attribute information;
receiving an acknowledgement message replied by the control plane; and
reporting the service attribute information to the control plane.

11. The method of claim 10, wherein the service attribute information is transmitted between the first SR node and the control plane through a PCEP;
   the request message comprises a start open message in the PCEP; and
   the service attribute information is reported through an explicit route object (ERO) field in the PCEP.

12. The method of claim 1, wherein the related information of the SR proxy node comprises:
   the target SID associated with the SR proxy node, the source of the target SID, the type of the target SID, the proxy type corresponding to the target SID and the service type corresponding to the target SID;
      wherein the source of the target SID comprises notifying through a protocol and configuring locally;
      the type of the target SID comprises non-local SID and local SID; and
      the forwarding table generated according to the local SID has higher priority than that of the forwarding table generated according to the non-local SID.

13. The method of claim 12, wherein, when the type of the target SID is the local SID and the target SID is configured as an SRv6 programming format, the target SID is used for notifying the proxy type.

14. The method of claim 1, wherein the forwarding table comprises:
   the target SID, the type of the target SID, and the first processing mode for the target SID;
   when the SR service message is processed according to the forwarding table after the SR service message returned by the SR proxy node is received, the forwarding table further comprises:
      the feature of the target SID, and the second processing mode for the target SID; and
      the target SID is a new routing prefix SID, or the target SID consists of an interface prefix for notifying the reachable information and a set function.

15. The method of claim 14, wherein the transmitting the SR service message to the SR proxy node according to the forwarding table comprises:
   when the target SID consists of an interface prefix for notifying the reachable information and a set function, transmitting the SR service message to the SR proxy node according to the interface prefix and the set function.

16. A routing device, comprising:
   at least one processer; and
   a storage device configured to store at least one program;
wherein the at least one program, when executed by the at least one processor, causes the at least one processor to perform a method for segment routing service processing, applicable to a first segment routing (SR) node, the method comprising:
   configuring by the first SR node, a local segment identifier (SID), the local SID being used for indicating an associated SR proxy node, and preventing the associated SR proxy node from being assigned with an SID, wherein the first SR node is adjacent to the associated SR proxy node;
   notifying by the first SR node, reachable information to a second SR node, the reachable information comprising the local SID;
   acquiring by the first SR node, service attribute information of the associated node comprising an SR service node and an SR proxy node; and
   transmitting by the first SR node, a notification message containing the service attribute information to the second SR node;
   wherein, the method further comprises:
   generating by the first SR node, a forwarding table according to related information of the associated SR proxy node;
   receiving by the first SR node, an SR service message orchestrated by the control plane;
   transmitting by the first SR node, the SR service message to the associated SR proxy node according to the forwarding table; and
   receiving by the first SR node, the SR service message returned by the associated SR proxy node; and
   before transmitting by the first SR node, the SR service message to the associated SR proxy node according to the forwarding table or after receiving by the first SR node, the associated SR service message returned by the SR proxy node, the method further comprises:

processing by the first SR node, the SR service message according to the forwarding table.

17. A non-transitory computer-readable storage medium storing computer programs which, when executed by a processor, cause the processor to perform a method for segment routing service processing, the method comprising:
configuring by the first SR node, a local segment identifier (SID), the local SID being used for indicating an associated SR proxy node; and preventing the associated SR proxy node from being assigned with an SID; wherein the first SR node is adjacent to the associated SR proxy node;
notifying by the first SR node, reachable information to a second SR node, the reachable information comprising the local SID;
acquiring by the first SR node, service attribute information of the associated SR proxy node; and
transmitting by the first SR node, a notification message containing the service attribute information to the second SR node;
wherein, the method further comprises:
generating by the first SR node, a forwarding table according to related information of the associated SR proxy node;
receiving by the first SR node, an SR service message orchestrated by the control plane;
transmitting by the first SR node, the SR service message to the associated SR proxy node according to the forwarding table; and
receiving by the first SR node, the SR service message returned by the associated SR proxy node; and
before transmitting by the first SR node, the SR service message to the associated SR proxy node according to the forwarding table or after receiving by the first SR node, the associated SR service message returned by the SR proxy node, the method further comprises:
processing by the first SR node, the SR service message according to the forwarding table.

* * * * *